US008495387B2

(12) United States Patent
Starr (10) Patent No.: US 8,495,387 B2
(45) Date of Patent: Jul. 23, 2013

(54) ENCRYPTION REDUNDANCY IN A STORAGE ELEMENT ARRAY

(75) Inventor: Matthew Thomas Starr, Lafayette, CO (US)

(73) Assignee: Spectra Logic Corporation, Boulder, CO (US)

( * ) Notice: Subject to any disclaimer, the term of this patent is extended or adjusted under 35 U.S.C. 154(b) by 157 days.

(21) Appl. No.: 13/285,989

(22) Filed: Oct. 31, 2011

(65) Prior Publication Data

US 2013/0111218 A1     May 2, 2013

(51) Int. Cl.
*G06F 11/30*     (2006.01)
*G06F 12/14*     (2006.01)

(52) U.S. Cl.
USPC ........................................................ 713/189

(58) Field of Classification Search
USPC ........................................................ 713/189
See application file for complete search history.

(56) References Cited

U.S. PATENT DOCUMENTS

| | | | |
|---|---|---|---|
| 5,668,800 A | 9/1997 | Stevenson | |
| 5,883,864 A | 3/1999 | Saliba | |
| 6,269,330 B1 | 7/2001 | Cidon et al. | |
| 6,490,253 B1 | 12/2002 | Miller et al. | |
| 6,715,031 B2 | 3/2004 | Camble et al. | |
| 6,823,401 B2 | 11/2004 | Feather et al. | |
| 6,839,824 B2 | 1/2005 | Camble et al. | |
| 6,845,160 B1 | 1/2005 | Aoki | |
| 7,080,259 B1 | 7/2006 | Nakanishi | |
| 7,443,801 B2 | 10/2008 | Neidhardt et al. | |
| 7,492,720 B2 | 2/2009 | Pruthi et al. | |
| 7,573,664 B2 | 8/2009 | Bentley et al. | |
| 7,583,604 B2 | 9/2009 | Couturier | |
| 7,596,096 B2 | 9/2009 | Crawford et al. | |
| 2003/0074319 A1 | 4/2003 | Jaquette | |

FOREIGN PATENT DOCUMENTS

| EP | 726570 | 8/1996 |
|---|---|---|
| GB | 2419198 | 4/2006 |

*Primary Examiner* — Kambiz Zand
*Assistant Examiner* — Stephen Sanders
(74) *Attorney, Agent, or Firm* — Kenneth Altshuler (57) ABSTRACT

An apparatus and associated method for writing encryption data to memory in a plurality of partially overlapping data segments and subsequently retrieving the encryption data by combining a selected one of either a first set of the overlapping data segments that define the encrypted data or a different second set of the overlapping data segments that define the encrypted data.

24 Claims, 12 Drawing Sheets

ENCRYPTION REDUNDANCY IN A STORAGE ELEMENT ARRAY

FIELD OF THE INVENTION

The claimed invention relates generally to encrypting data stored in a storage element array and more particularly but not by way of limitation to providing redundancy in the availability of encrypted data to enhance the throughput capability of the storage element array.

BACKGROUND

A storage element array is generally a cooperative arrangement of a plurality of storage elements that are individually, and preferably concurrently, accessible by a client device as if all the storage elements were lumped into one storage unit. The type or types of storage elements used is not limited, permitting the selection of different types of storage elements to leverage the inherent advantages of each under certain operating conditions and/or processing requirements. Typical storage elements include tape cartridges, disk drives, solid state drives, optical drives, semiconductor memory devices generally, and the like, and various combinations thereof.

A tape drive array, for example, includes a plurality of discrete tape drives under common control of an array controller. The array controller virtualizes the totality of the physical storage space afforded by the plurality of tape drives and selectable tape cartridges forming the array, and presents that totality of physical storage capacity to one or more clients in the form of one or more virtual storage spaces.

A tape drive is inherently susceptible to write errors due to defects or even just variations in the recording material of the tape cartridge. The ongoing demand for recording material capable of greater storage density concomitantly increases the adverse effects of these writing errors. That is, writing error rates that could in the past be disregarded as negligible without adversely affecting either quality or performance now must be affirmatively reckoned with. Those errors adversely affect the availability of encrypted data.

A tape library is also inherently susceptible to data accessibility constraints due to the fact that there are more tape cartridges potentially available for use than there are tape drives to write data to and read data from any particular tape cartridge. Handling simultaneous calls for different processes such as high priority access commands in relation to some tape cartridges and other commands in relation to other tape cartridges can problematically choke the data throughput performance of the tape library. The claimed embodiments are directed to improvements resulting from performing encryption command processing from a pool of redundant encrypted data, providing an opportunity to select a set of encrypted data from a corresponding plurality of storage elements that optimizes the totality of the operating performance characteristics in view of other data processing activities and data availability or integrity.

SUMMARY

In some embodiments a controller executes encryption logic to write encrypted data to memory in a plurality of partially overlapping data segments and to subsequently retrieve the encrypted data by combining a selected one of either a first set of the overlapping data segments that define the encrypted data or a different second set of the overlapping data segments that define the encrypted data.

In some embodiments a method is provided including steps of writing encrypted data to memory in a plurality of overlapping data segments; and after the writing step, retrieving the encrypted data by combining a selected one of either a first set of the overlapping data segments or a different second set of the overlapping data segments.

In some embodiments an apparatus is provided having a plurality of storage elements arranged and concurrently accessible in an array to selectively store data to and retrieve data from each of the plurality of storage elements, and further having means for retrieving data stored in the array by combining one of a first set of data segments from a respective plurality of the storage elements that define encrypted data and a different second set of data segments from a different plurality of the storage elements that define the encrypted data.

DETAILED DESCRIPTION

Initially, it is to be appreciated that this disclosure is by way of example only, not by limitation. The concepts herein are not limited to use or application with a specific system or method for using storage element devices to form a storage array with redundancy capability for data encryption. Thus, although the instrumentalities described herein are for the convenience of explanation, shown and described with respect to exemplary embodiments, it will be appreciated that the principles herein may be applied equally in other types of storage element systems and methods involving the storage and retrieval of data.

Figure 1:
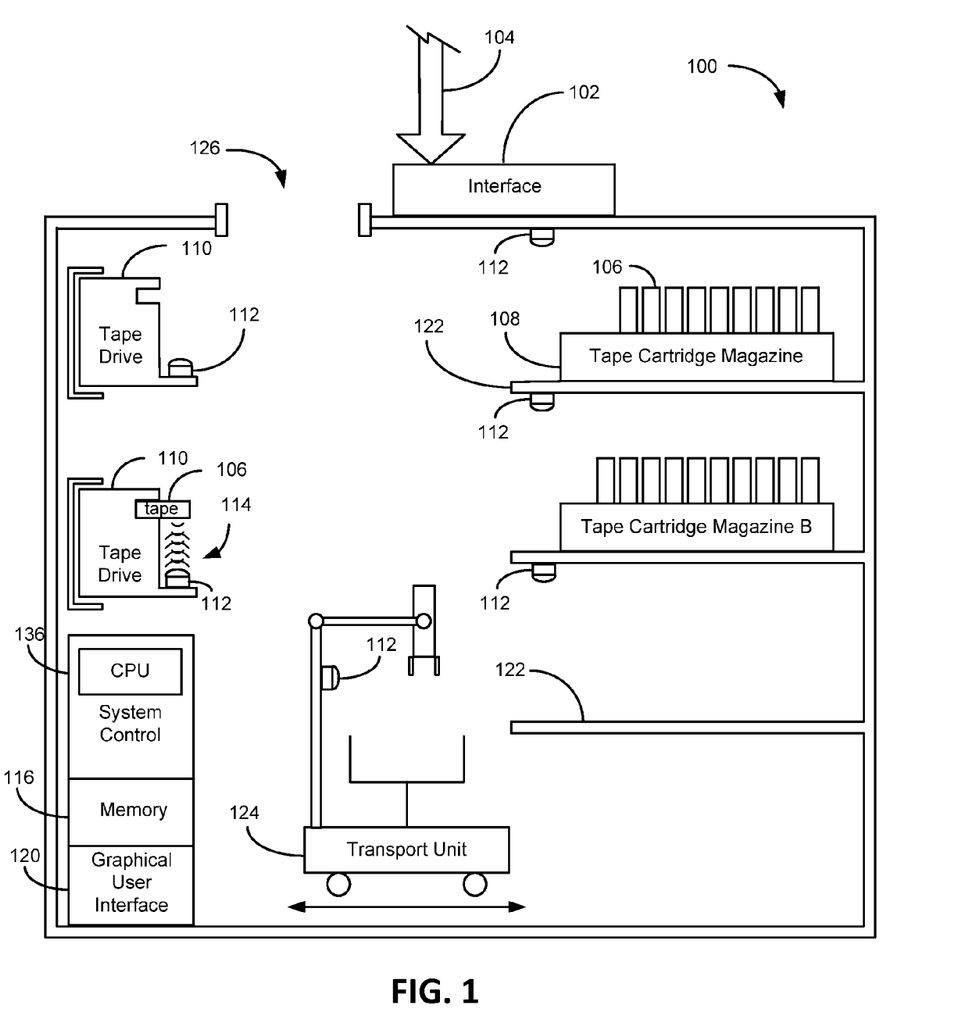
FIG. 1 diagrammatically depicts a tape library constructed in accordance with embodiments of the present invention.

FIG. 1 diagrammatically depicts a tape library 100. External communication for storing data to and retrieving data from the tape library 100 is performed via an interface 102 coupled to a communications link 104. The number and arrangement of the various components depicted in FIG. 1 are merely illustrative and in no way limiting of the claimed invention.

The tape library 100 has a plurality of tape cartridges 106 grouped in magazines 108. Each of the tape cartridges 106 is identifiable, such as by radio frequency identification (RFID) tags or semiconductor memory devices and the like, for selectively loading a desired one of the tape cartridges 106 into one of a plurality of tape drives 110. These illustrative embodiments depict the usage of a semiconductor memory in the form of a medium auxiliary memory ("MAM") device for this purpose, as discussed in more detail below.

Each of the tape cartridges 106 is selectively loadable into one of the tape drives 110 in an operable data transfer relationship to store data to and/or retrieve data from the tape cartridge 106. Each tape drive 110 can have a MAM device reader/writer 112 to store data to and/or retrieve data from the MAM device. In these illustrative embodiments the tape drive 110 establishes wireless communications 114 with the MAM device, such as by radio frequency communication, although neither the disclosed embodiments nor the claimed embodiments are so limited to those illustrative embodiments. The MAM device data can advantageously include access occurrence data, such as timestamp data indicating when the tape cartridge 106 is loaded in a tape drive 110, load count data indicating how long a tape cartridge 106 is loaded in the tape drive 110, validity data indicating any data and/or portions of the storage medium in a tape cartridge 106 of questionable integrity, and the like. Besides, or in addition to, storing data on the MAM devices, a larger system memory 116 can accommodate information, such as the access occurrence data, load data, validity data, and the like, from each of a plurality of MAM devices associated with respective tape cartridges 106. Computational routines on the data stored in the MAM devices and in the system memory 116 can be controlled at a top level by control circuitry 118 under the top-level control of a central processing unit ("CPU"). A graphical user interface ("GUI") 120 provides helpful tabular and graphical information to a user of the tape library 100 for providing inputs to and receiving useful outputs from the tape library 100.

The tape library 100 can advantageously have a shelving system 122 capable of processor-based archiving the magazines 108 within the tape library 100. A transport unit 124 shuttles magazines 108 between the shelving system 122 and the tape drives 110, and picks and places a particular tape cartridge 106 from a shuttled magazine 108 to/from a desired tape drive 110. Again, although FIG. 1 diagrammatically depicts two magazines 108 of eleven tape cartridges 106 each being shuttled to and from two tape drives 110, that arrangement is merely illustrative and in no way limiting of the claimed embodiments. In any event, a desired number of tape drives 110 can be provided within the tape library 100 to concurrently access a corresponding number of tape cartridges 106 in a storage element array, or two or more tape libraries 100 can communicate with each other to form that same or a similar storage element array.

The tape library 100 is not necessarily limited to using a fixed number of tape cartridges 106. Rather, an access port 126 is configured to cooperate with an external transport system (not shown) to deliver or remove individual tape cartridges 106 or magazines 108.

Top level control is provided by the CPU in communication with all the various components via a computer area network (not shown). Data, virtual mappings, executable computer instructions, operating systems, applications, and the like are stored to the system memory 116 and accessed by one or more processors in and/or under the control of the CPU. The CPU includes macroprocessors, microprocessors, memory, and the like to logically carry out software algorithms and instructions.

As one skilled in the art will recognize, the illustration of the tape library 100 in FIG. 1 diagrammatically depicts only major elements of interest for purposes of simplicity. As such, certain necessary structures and components for the aforementioned elements to properly function are omitted from the detailed description, the enumeration of such not being necessary for the skilled artisan to readily ascertain the enablement of this description and the scope of the claimed subject matter. For example, it will be understood that the tape library 100 includes all of the necessary wiring, user interfaces, plugs, modular components, entry and exit port(s) to introduce (or remove) removable storage elements, fault protectors, power supplies, processors, busses, robotic transport unit tracks, indication lights, and so on, in order to carry out the function of a tape library.

Figure 2:
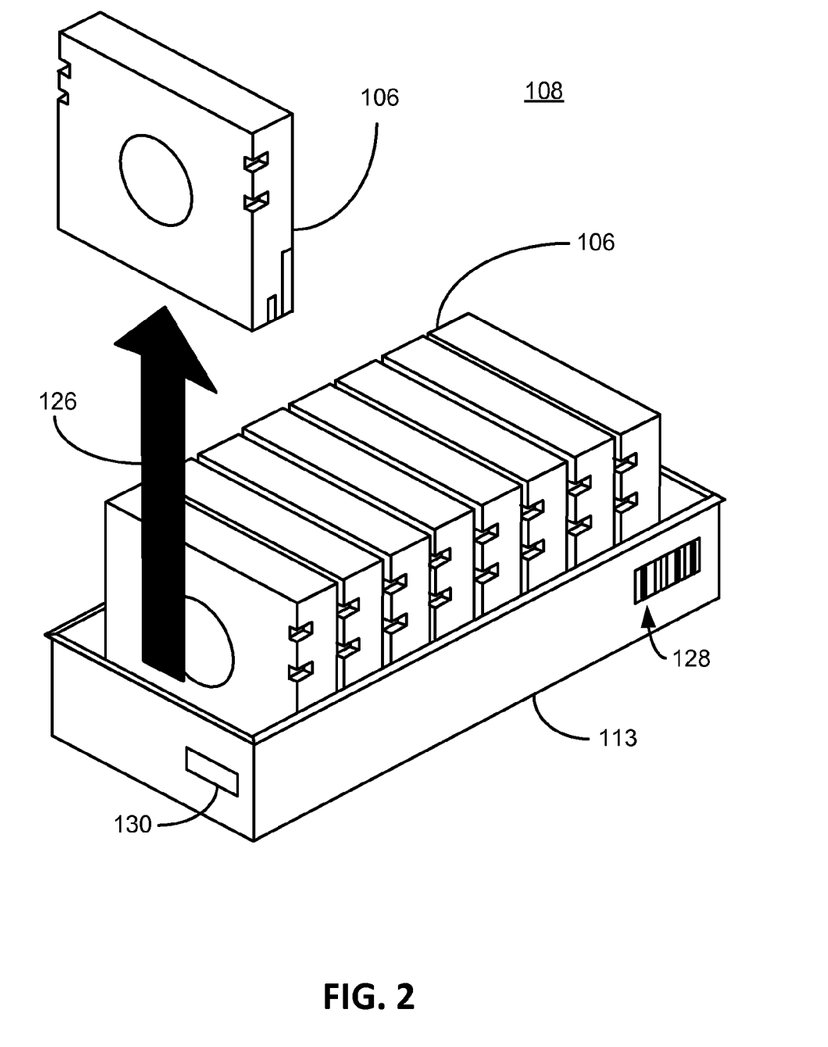
FIG. 2 is an isometric depiction of a magazine of tape cartridges in the tape library of FIG. 1.

FIG. 2 depicts the tape cartridges 106 supported for storage and transit by the magazine 108. In more detail, the tape cartridge 106, such as an LTO-3 category tape cartridge manufactured by IBM, of Armonk, N.Y., employs magnetic tape that is capable of storing digital data written by the tape drive 110. The magazine 108 is depicted as being populated with a plurality of the tape cartridges 106, each of which can be removed upwardly by the transport unit 114, in the direction of arrow 126, then inserted into the tape drive 110.

Figure 3:
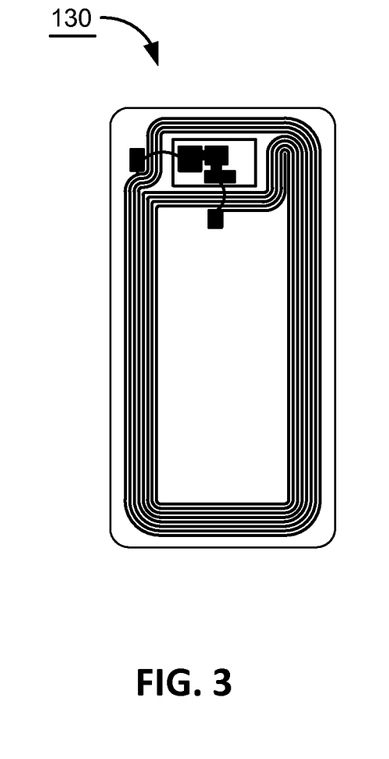
FIG. 3 diagrammatically depicts a medium auxiliary memory device in the tape library of FIG. 1.

An indicia such as a bar code identification tag 128 is one way of identifying the magazine 108. Additionally, these embodiments depict a MAM device 130 attached to the magazine 108 and associated with one or more, preferably all, of the tape cartridges 106 residing in the magazine 108. Alternatively, the MAM device 130 can be attached to the tape cartridge 106. FIG. 3 depicts illustrative embodiments of the MAM device 130 in the form of an integrated circuit including solid state memory and a transponder attached to a coil forming an antenna. The MAM device 130 is a passive device that is energized when subjected to a sufficiently strong radio frequency field generated by the MAM writer/reader device 112 (FIG. 1). FIG. 3 diagrammatically depicts a medium auxiliary memory device 130 in the tape library of FIG. 1.

Figure 4:
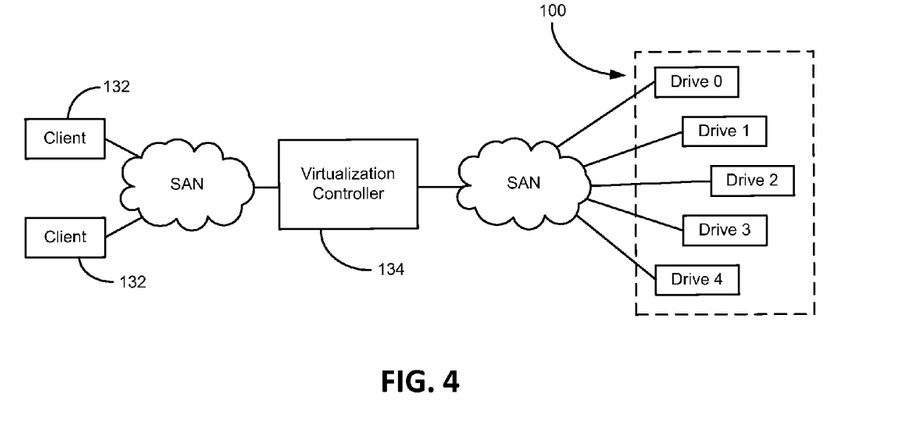
FIG. 4 is a block diagram of the tape library of FIG. 1 in a virtualized distributed storage system.

FIG. 4 diagrammatically depicts illustrative embodiments of the library 100 connected externally to a network to function as a storage element array in a distributed storage system. Each of the remote clients 132 can view the entire physical storage capacity of the tape library 100 (as collectively defined by the tape cartridges 106) as a unified storage space. A virtualization controller 134 is depicted in these illustrative embodiments as a network node that passes user data and storage management information between the tape library 100 and the clients 132 via network links such as, but not necessarily limited to, fibre channel storage area networks (SANs). The virtualization controller 134 also buffers data being transferred between the clients 132 and the tape library 100 to permit optimal tape cartridge 106 utilization and, in turn, maximizing data throughput performance.

Figure 5:
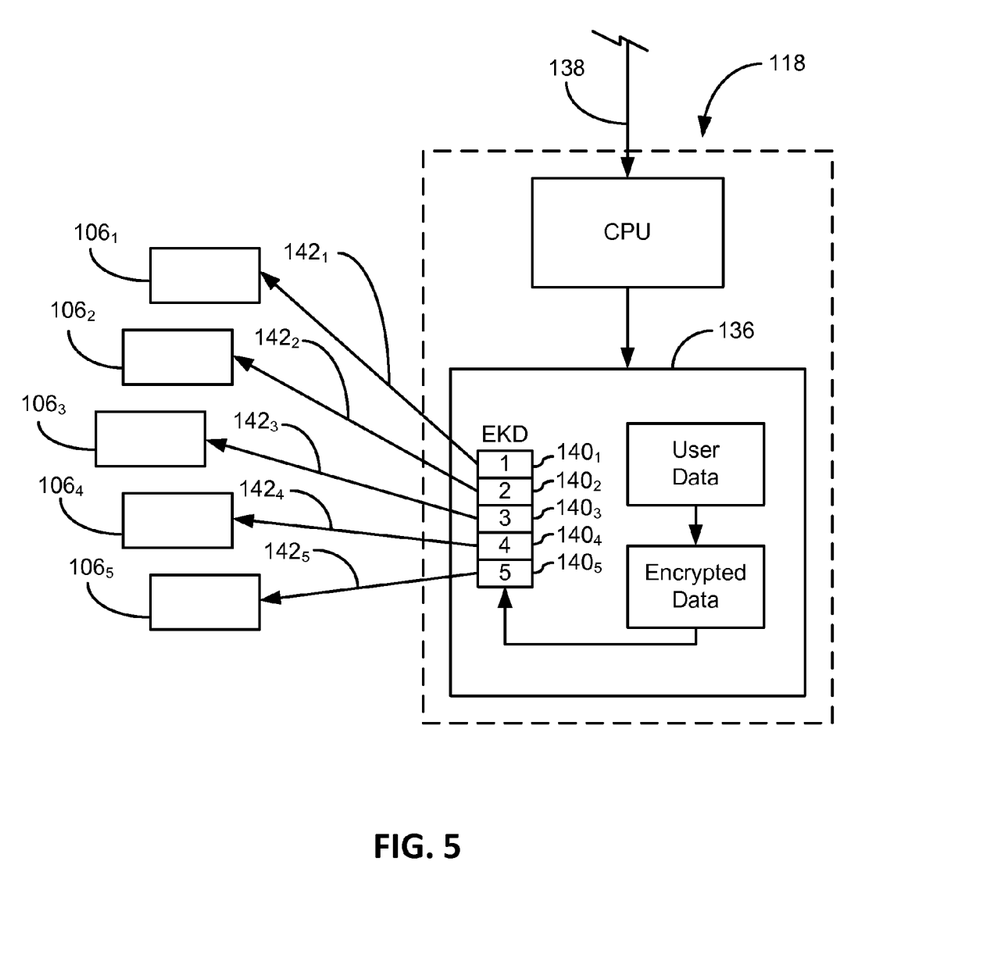
FIG. 5 is a block diagram of a portion of the control circuitry in the tape library of FIG. 1.

FIG. 5 diagrammatically depicts portions of the control circuitry 118 having, among other things, an encryption controller 136 that executes computer instructions stored in memory to control encrypting data stored to the tape library 100, and to control subsequently decrypting that data when it is retrieved from the tape library 100. Generally, the encryption controller 136 generates encryption data ("ED") 140 corresponding to user data received from a client 132, and stores the encrypted data to one or more storage elements such as the tape cartridges 106. In accordance with illustrative embodiments the encryption controller 136 derives from the ED 140 a plurality of discrete data segments $142_n$ and stores each of the data segments $142_n$ to a respective storage element, such as the tape cartridge 106. The data segments $142_n$ can be stored to the tape medium itself in the tape cartridge 106 or can be stored to the MAM device 130 either on the tape cartridge 106 or on the magazine 108. The data segments $142_n$ collectively include one or more sets of the ED $140_n$. In some embodiments the ED $140_n$ resides entirely in the data segments $142_n$ distributed among the tape cartridges 106. However, in alternative equivalent embodiments a master ED $140_n$ can be concurrently stored along with the data segments $142_n$ distributed among the tape cartridges 106.

When a client 132 subsequently sends a command to retrieve the encrypted data, the encryption controller 136 retrieves the ED 140 for use in decrypting the encrypted data before transferring it in response to the access command.

FIG. 5 diagrammatically depicts the CPU, having received an access command from the client 132 via link 138 to store data to the library 100, sending the corresponding user data to the encryption controller 136 which buffers the user data. The encryption controller 136 then generates the ED 140 corresponding to the user data before storing it to the library 100. The encryption controller 136 also divides the ED 140 into a predetermined number of ED portions (such as $140_1$-$140_5$ depicted in these illustrative embodiments), combines the ED portions $140_1$-$140_5$ into respective overlapping data segments $142_1$-$142_5$, and stores each of the data segments $142_n$ to a respective tape cartridge $106_n$.

Figure 6:
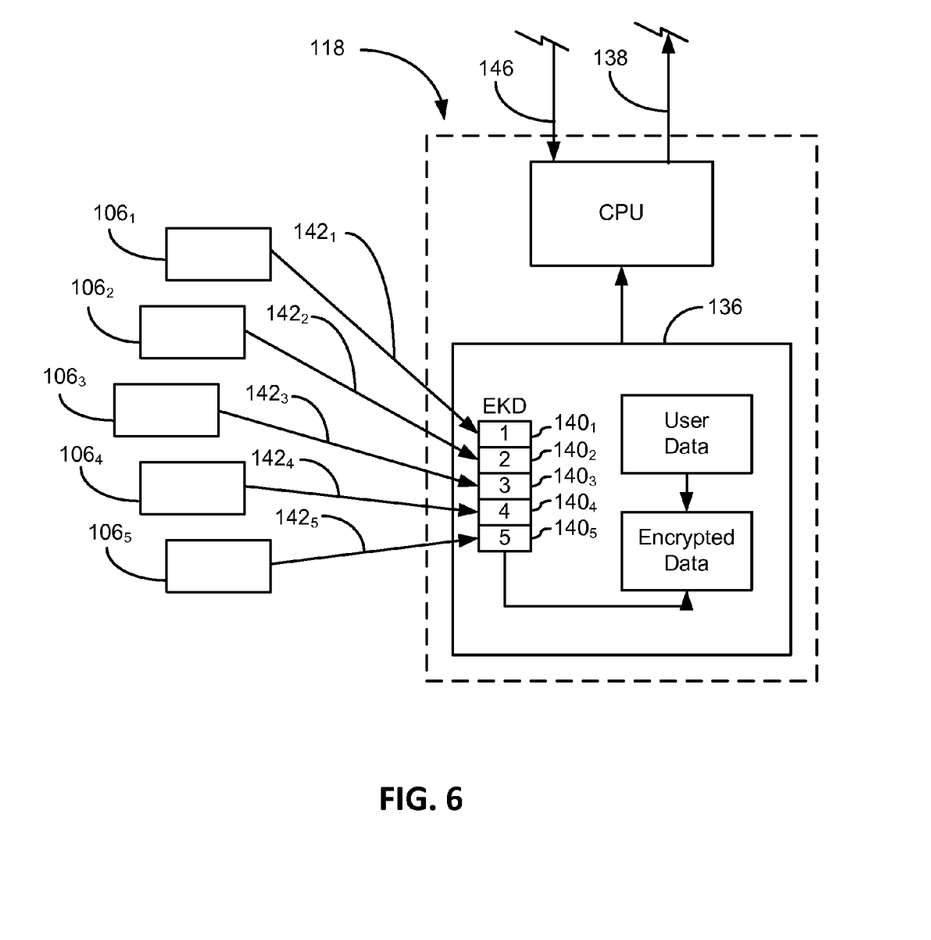
FIG. 6 is a block diagram similar to FIG. 5.

FIG. 6 diagrammatically depicts essentially the reverse of FIG. 5 in that the control circuitry 118 is responsive to an access command from the client 132 to retrieve user data from the tape library 100 and transfer it to the client 132 or elsewhere as the client 132 might designate via link 134. The encryption controller 136 retrieves all or a portion of the overlapping data segments $142_n$ to construct the ED 140. The ED 140 is compared to a key command 146. The key command can be embedded in the client access command or it can be separately input by a user of the tape library. A match from that comparison indicates that the client 132 is authorized to retrieve the requested data from the library 100. Under an authorized condition, the ED 140 is decrypted (user data) and then transferred per the client's instruction.

Figure 7:
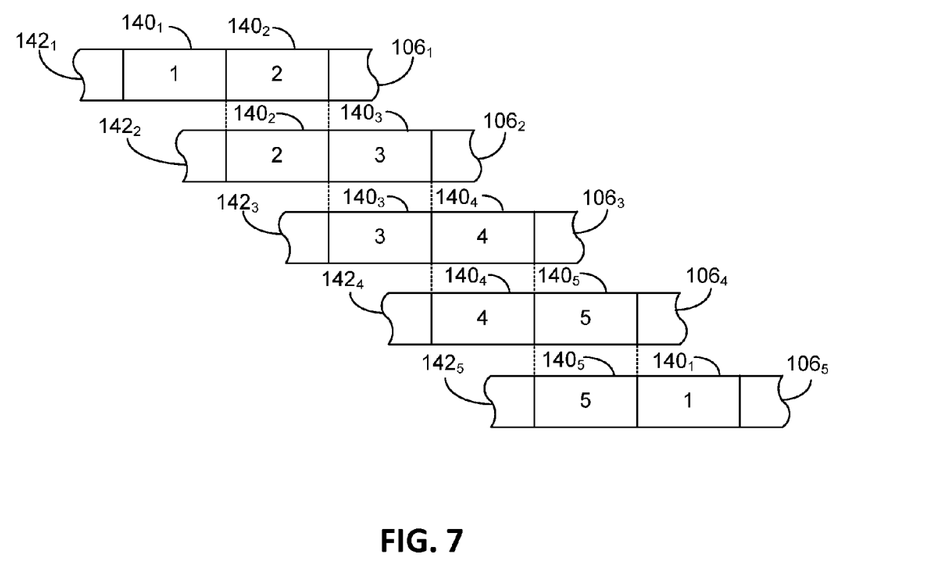
FIG. 7 diagrammatically depicts the overlapping data segments stored to the respective storage elements in the tape library of FIG. 1.

FIG. 7 depicts illustrative embodiments of the overlapping data segments $142_1$-$142_5$ that are derived by the encryption controller 136 and stored to the respective tape cartridges $106_1$-$106_5$. By "stored to the tape cartridges $106_1$-$106_5$" it is meant that the data segments $142_n$ can be stored to the tape medium itself in the tape cartridge 106, can be stored to the MAM device 130 either attached to that tape cartridge 106 or to the respective magazine 108, or stored to any other accessible memory contained in or on the tape cartridge 106. By making each of the data portions $140_n$ retrievable from two different tape cartridges $106_n$, redundancy is provided in that the ED 140 can be retrieved by combining a selected one of either a first set of the overlapping data segments $142_n$ that define the ED 140 or alternatively combining a different second set of the overlapping segments $142_n$ that define the ED 140.

In these illustrative embodiments the first data portion $140_1$ is written to the first storage element $106_1$ and to the fifth storage element $106_5$. The second data portion $140_2$ is written to the first storage element $106_1$ and to the second storage element $106_2$. The first data portion $140_1$ and the second data portion $140_2$ form the first data segment $142_1$ stored to the first storage element $106_1$.

Similarly, the third data portion $140_3$ is written to both the second storage element $106_2$ and the third storage element $106_3$. The second data portion $140_2$ and the third data portion $140_3$ form the second data segment $142_2$ stored to the second storage element $106_2$.

The fourth data portion $140_4$ is written to the third storage element $106_3$ and to the fourth storage element $106_4$. The third data portion $140_3$ and the fourth data portion $140_4$ form the third data segment $142_3$ stored to the third storage element $106_3$.

Finally, the fifth data portion $140_5$ is written to both the fourth storage element $106_4$ and the fifth storage element $106_5$. The fourth data portion $140_4$ and the fifth data portion $140_5$ form the fourth data segment $142_4$ stored to the fourth storage element $106_4$. The fifth data portion $140_5$ and the first data portion $140_1$ are combined to form the fifth data segment $142_5$ stored in the fifth storage element $106_5$.

Figure 8:
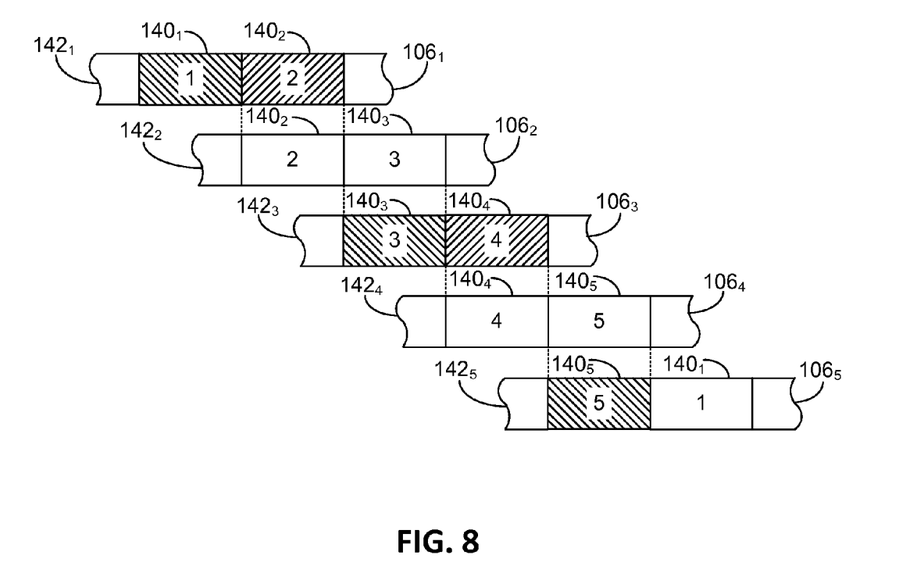
FIG. 8 is similar to FIG. 7 depicting a first set of data segments selected for retrieving the encrypted data.

FIG. 8 depicts illustrative embodiments wherein the encryption controller 136 retrieves the full complement of ED $140_1$-$140_5$ (shaded portions $140_n$) from only the first data segment $142_1$ (data portions $140_1$, $140_2$), the third data segment $142_3$ (data portions $140_3$, $140_4$), and the fifth data segment $142_5$ (data portion $140_5$). In these illustrative embodiments, that would require access to three storage elements $106_1$, $106_3$, $106_5$. Alternatively, FIG. 9 depicts illustrative embodiments wherein the encryption controller 136 retrieves the full complement of ED $140_1$-$140_5$ (shaded portions $140_1$) from only the second data segment $142_2$ (data portions $140_2$, $140_3$), the fourth data segment $142_4$ (data portions $140_4$, $140_5$), and the fifth data segment $142_5$ (data portion $140_1$).

From these illustrative embodiments it will be generally recognized that where the encrypted data is stored in a number "M" of tape cartridges, and where a number "N" data portions $140_n$ are combined to form each of the data segments $142_n$, then a number "M-N" of the tape cartridges must be read in order to retrieve the encrypted data. If, for another example, it is desirous to read all of the encrypted data simultaneously then a number "M-N" of tape drives must be available to simultaneously read the same number of tape cartridges.

Selecting which of the two sets of overlapping data segments $142_n$ to use can advantageously be determined in relation to which of the storage elements $106_n$ are more efficiently available in conjunction with and in the context of the other data access command activity at the time. Of course, at times the selection of which of the two sets of overlapping data segments $142_n$ use can be determined in relation to an unavailability of a particular storage element $106_n$, or perhaps an indication of invalid data where a data segment $142_n$ is stored. In some embodiments logic is provided that when a comparison of the first set of data segments to the key data results in a mismatch or otherwise a failure, then the CPU automatically switches to the second set of data segments for comparison to the data.

Figure 9:
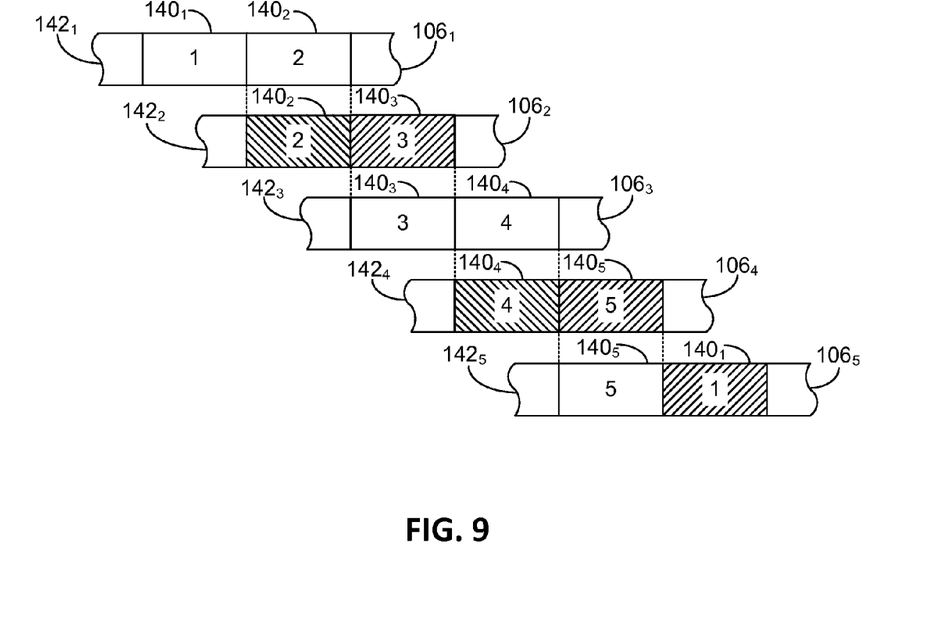
FIG. 9 is similar to FIG. 7 depicting a different second set of data segments selected for retrieving the encrypted data.

Clearly, the full complement of ED $140_1$-$140_5$ is retrievable by combining other data portions $140_n$ than those depicted in FIGS. 8 and 9, but an enumeration of all possible combinations is not necessary for the skilled artisan to ascertain an enablement of the disclosed embodiments and a scope of the claimed subject matter.

Figure 10:
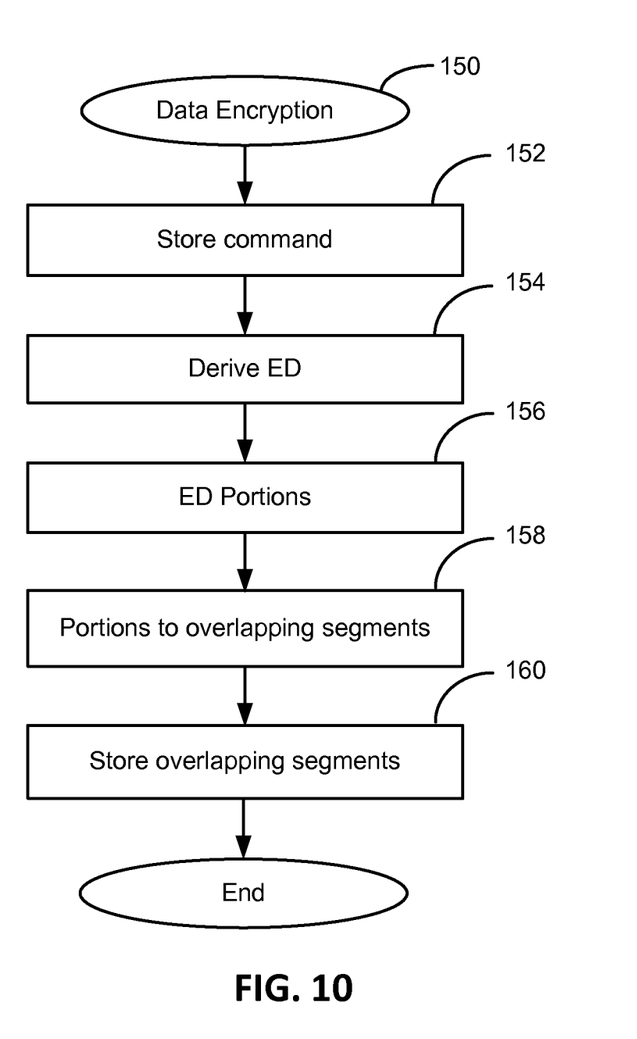
FIG. 10 is a flowchart depicting steps in a method of DATA ENCRYPTION in accordance with embodiments of the present invention.

FIG. 10 is a flowchart depicting steps in a method 150 for DATA ENCRYPTION in accordance with embodiments of the present invention. The method 150 begins in block 152 with receipt by the tape library of an access command from the client for storing data to the tape library. In block 154 the controller derives the encryption data (ED) 140 and then divides the ED 140 in block 156 into a predetermined number of data portions 140$_n$. In block 158 the controller combines the data portions 140$_n$ into a predetermined number of overlapping data segments 142$_n$, which are then stored to a respective number of storage elements in block 160.

Figure 11:
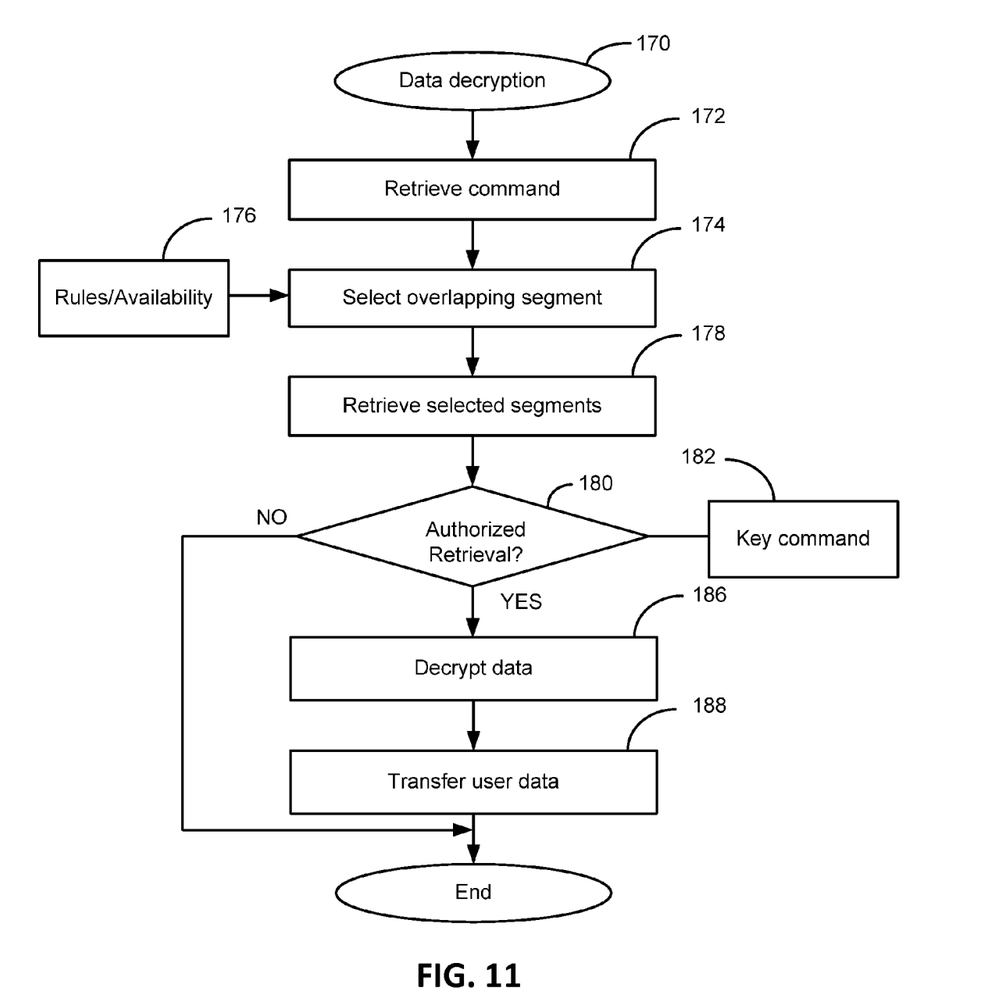
FIG. 11 is a flowchart depicting steps in a method of DATA DECRYPTION in accordance with embodiments of the present invention.

FIG. 11 is a flowchart depicting steps in a method 170 for DATA DECRYPTION in accordance with embodiments of the present invention. The method 170 begins in block 172 with receipt by the tape library of an access command from the client for retrieving data from the tape library. In block 174 the encryption controller selects a set of previously stored overlapping data segments in view of input from block 176 defining rules and/or providing availability information for the various storage elements in which the data segments are stored. In block 178 the selected data segments are retrieved. In block 180 the determination is made as to whether the retrieve command is authorized by comparing a key command in block 182 to the encrypted data (ED) obtained by the full complement of the ED from the data segments in block 178. If the determination of block 180 is "yes," then in block 186 the retrieved encrypted data is decrypted (user data), and in block 188 the user data is transferred in accordance with the access command received in block 172.

Generally, the embodiments of the present invention contemplate a storage element array having a plurality of storage elements arranged and concurrently accessible in a desired redundancy arrangement to selectively store data to and retrieve data from each of the plurality of storage elements. The storage element array also has a means for retrieving data stored in the array by selectively combining one of a plurality of different data segments that define the ED. For purposes of this description and meaning of the appended claims, the term "means for retrieving" encompasses the disclosed structure and equivalent structures that function to redundantly store the ED so that it can be retrieved by a selected one of a first plurality of data segments and a second plurality of data segments. "Means for retrieving" explicitly does not encompass previous attempted solutions that merely store and retrieve the ED without any sort of redundancy for selectively retrieving the ED.

Figure 12:
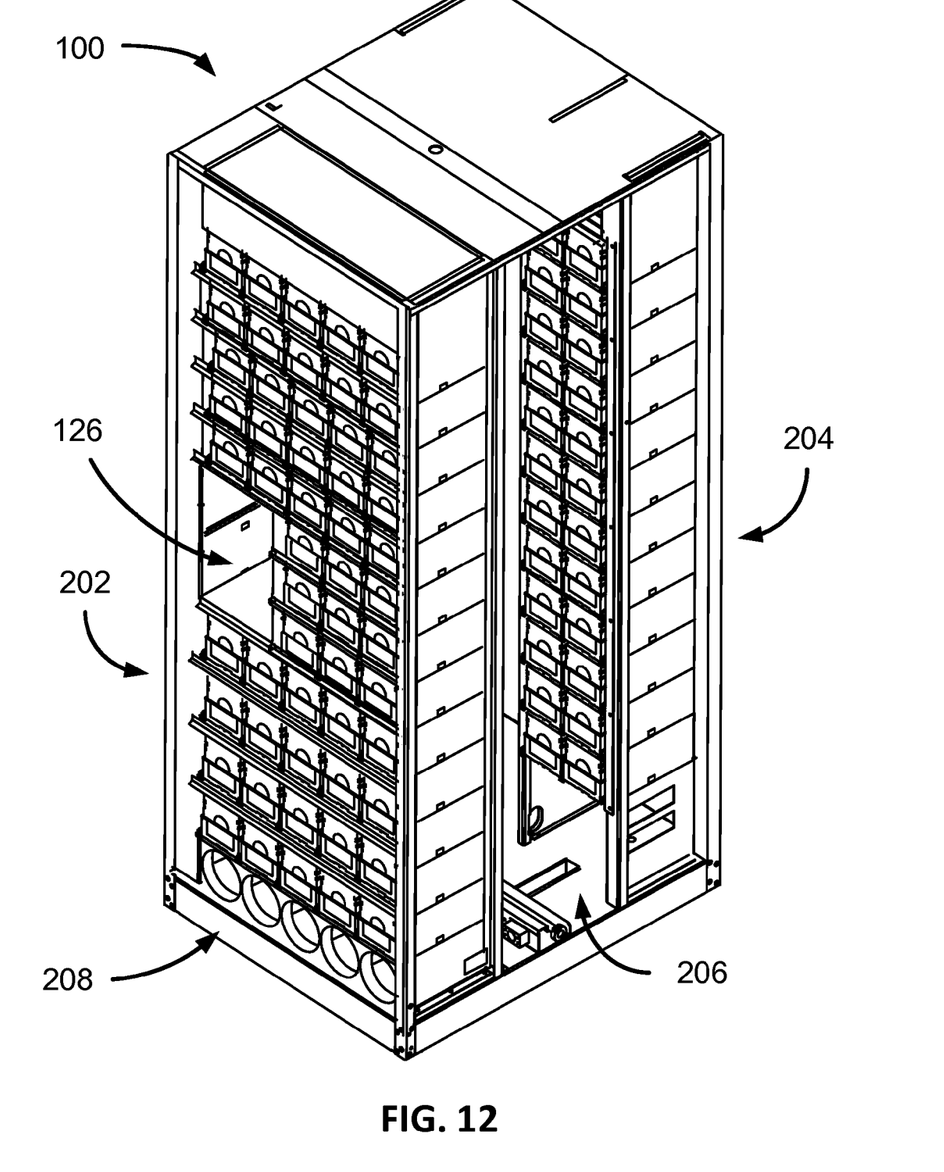
FIG. 12 depicts more details of the tape library of FIG. 1.

Embodiments of the present invention can be commercially practiced in a Spectra Logic T-950 tape cartridge library manufactured by Spectra Logic of Boulder Colo. FIG. 12 shows a commercial embodiment of one T-950 library unit 100 (FIG. 1) without an enclosure. The T-950 library 100 comprises a first and second shelf system 202, 204 that are adapted to support a plurality of the mobile media, such as the magazine 108 (FIG. 1) holding a plurality of LTO-3 tape cartridges 106 with MAMs, archived by the library 100. The shelf systems 202, 204 can each have at least one auxiliary memory reader. Disposed next to the second shelf system 204 are at least four IBM LTO-3 tape drives 110 adapted to write data to and read data from a tape cartridge 106. The IBM LTO-3 tape drives 110 each have the capability of storing data to an auxiliary radio frequency memory device contained in an LTO-3 tape cartridge 106. Functionally interposed between the first and second shelf system 202, 204 is a magazine transport space 206. The magazine transport space 206 is adapted to provide adequate space for a magazine 108 to be moved, via the transport unit 124 (FIG. 1), from a position in the first shelf system 202, for example, to a tape drive 110. The transport unit 124 can further accommodate at least one auxiliary radio frequency memory device reader. Magazines 108 can be transferred into and out from the T-950 library 100 via the entry/exit port 126. Transferring magazines 108 in and out of the T-950 library 100 can be accomplished by an operator, for example. The T-950 library 100 comprises a means for cooling as shown by the fans 208, located at the base of the library 100. The T-950 library 100 can be linked to a central data base, providing control in storage of all of the auxiliary radio frequency memory devices contained in each tape cartridge 106 in the T-950 library 100 as read by any one of the auxiliary radio frequency memory device readers. The T-950 library 100 also includes the library controller (not shown) that can function as the processor device in addition to an auxiliary storage device, such as a disk drive (or plurality of disk drives). The T-950 library 100 also provides the graphical user interface (not shown) whereon a display of assessment results or, in alternative embodiments, simple messages can be displayed pertaining to a user-specified action associated with a tape cartridge 106 such as an alert accompanying a sound alarm or recommendations for further action/s, for example.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, multiple, or all tape drives in a library, can be managed in the data encryption process for example, while still maintaining substantially the same functionality without departing from the scope and spirit of the claimed invention. Another example can include using these techniques across multiple library partitions, while still maintaining substantially the same functionality without departing from the scope and spirit of the claimed invention. Further, though communication is described herein as between a client and the library, such as the library 100, communication can be received directly by a tape drive, via the interface device 102, for example, without departing from the scope and spirit of the claimed invention. Further, for purposes of illustration, a first and second tape drive and tape cartridges are used herein to simplify the description for a plurality of drives and tape cartridges. Finally, although the preferred embodiments described herein are directed to tape drive systems, and related technology, it will be appreciated by those skilled in the art that the claimed invention can be applied to other systems, without departing from the spirit and scope of the present invention.

It will be clear that the claimed invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the claimed invention disclosed and as defined in the appended claims.

It is to be understood that even though numerous characteristics and advantages of various aspects have been set forth in the foregoing description, together with details of the structure and function, this disclosure is illustrative only, and changes may be made in detail, especially in matters of structure and arrangement to the full extent indicated by the broad general meaning of the terms in which the appended claims are expressed.

What is claimed:

1. An apparatus comprising a controller executing encryption logic to write encrypted data to memory in a plurality of partially overlapping data segments and to subsequently retrieve the encrypted data by combining a selected one of either a first set of the overlapping data segments that define the encrypted data or a different second set of the overlapping data segments that define the encrypted data.

2. The apparatus of claim 1 wherein the plurality of overlapping data segments are written to a respective plurality of storage elements arranged and concurrently accessible in an array.

3. The apparatus of claim 2 wherein at least one of the plurality of storage elements is characterized as a tape cartridge.

4. The apparatus of claim 3 wherein at least one of the overlapping data segments is written to a medium auxiliary memory portion of the tape cartridge.

5. The apparatus of claim 2 wherein a first portion of the encrypted data is written to a first storage element of the plurality of storage elements, a second portion of the encrypted data is written to the first storage element and to a second storage element of the plurality of storage elements, and a third portion of the encrypted data is written to the second storage element.

6. The apparatus of claim 5 wherein the first portion and the second portion stored in the first storage element define a first data segment of the plurality of data segments, and wherein the second portion and the third portion stored in the second storage element define a second data segment of the plurality of data segments.

7. The apparatus of claim 5 wherein the first, second, and third portions of the encrypted data are sequential portions of the encryption data.

8. The apparatus of claim 5 wherein the third portion of the encrypted data is written to a third storage element of the plurality of storage elements, and a fourth portion of the encrypted data is written to the third storage element.

9. The apparatus of claim 8 wherein the third portion and the fourth portion stored in the third storage element define a third data segment of the plurality of data segments.

10. The apparatus of claim 8 wherein the fourth portion of the encrypted data is written to a fourth storage element of the plurality of storage elements, and a fifth portion of the encrypted data is written to the fourth storage element.

11. The apparatus of claim 10 wherein the fourth portion and fifth portion stored in the fourth storage element define a fourth data segment of the plurality of data segments.

12. The apparatus of claim 10 wherein the fifth portion of the encrypted data is written to a fifth storage element of the plurality of storage elements, and the first portion of the encrypted data is written to the fifth storage element.

13. The apparatus of claim 12 wherein the fifth portion and first portion stored in the fifth storage element define a fifth data segment of the plurality of data segments.

14. The apparatus of claim 12 wherein the encrypted data is defined by combining the first, second, third, fourth, and fifth portions, and wherein the encryption data is retrieved by combining one of the first set defined by the first, third, and fifth data segments and the second set defined by the second, fourth, and fifth data segments.

15. The apparatus of claim 1 characterized by each of the data segments having N number of data portions, and further characterized by writing the data segments to M number of storage elements, wherein a minimum number of M-N storage elements are accessed to retrieve the encrypted data.

16. A method comprising:
writing encrypted data to memory in a plurality of overlapping data segments; and
after the writing step, retrieving the encrypted data by combining a selected one of either a first set of the overlapping data segments or a different second set of the overlapping data segments.

17. The method of claim 16 wherein the writing step is characterized by writing a first portion of the encrypted data to a first storage element of a plurality of storage elements, writing a second portion of the encrypted data to the first storage element and to a second storage element of the plurality of storage elements, and writing a third portion of the encrypted data to the second storage element.

18. The method of claim 17 wherein the writing step is characterized by writing the third portion of the encrypted data to a third storage element of the plurality of storage elements, and writing a fourth portion of the encrypted data to the third storage element.

19. The method of claim 18 wherein the writing step is characterized by writing the fourth portion of the encrypted data to a fourth storage element of the plurality of storage elements, and writing a fifth portion of the encrypted data to the fourth storage element.

20. The method of claim 19 wherein the writing step is characterized by writing the fifth portion of the encrypted data to a fifth storage element of the plurality of storage elements, and writing the first portion of the encrypted data to the fifth storage element.

21. The method of claim 20 wherein the writing step is characterized by the first portion and the second portion stored in the first storage element defining a first data segment of the plurality of data segments, the second portion and third portion stored in the second storage element defining a second data segment of the plurality of data segments, the third portion and the fourth portion stored in the third storage element defining a third data segment of the plurality of data segments, the fourth portion and fifth portion stored in the fourth storage element defining a fourth data segment of the plurality of data segments, the fifth portion and first portion stored in the fifth storage element defining a fifth data segment of the plurality of data segments, the writing step is further characterized by the encrypted data being defined by combining the first, second, third, fourth, and fifth portions, and wherein the retrieving step is characterized by retrieving a selected of one of the first set defined by the first, third, and fifth data segments and the second set defined by the second, fourth, and fifth data segments.

22. An apparatus comprising:
a plurality of storage elements arranged and concurrently accessible in an array to selectively store data to and retrieve data from each of the plurality of storage elements; and
means for retrieving data stored in the array by combining one of a first set of data segments from a respective plurality of the storage elements that define encrypted data and a different second set of data segments from a different plurality of the storage elements that define the encrypted data.

23. A storage array comprising:
a data transfer device capable of storing data to and retrieving data from each of a plurality of storage elements; and
overlapping data segments stored to each of the plurality of storage elements that are selectively retrieved for decrypting the data previously encrypted and stored to the storage elements.

24. An apparatus comprising:
a plurality of storage elements arranged and concurrently accessible in an array to selectively store data to and retrieve data from each of the plurality of storage elements; and
means for retrieving data stored in the array by combining one of a first set of data segments from a respective plurality of the storage elements that define a complete data set and a different second set of data segments from a different plurality of the storage elements that define the complete data set.

* * * * *